United States Patent
Couchman et al.

(10) Patent No.: US 12,448,948 B1
(45) Date of Patent: Oct. 21, 2025

(54) SYSTEM AND METHOD FOR MONITORING VIBRATIONS IN A DRIVETRAIN OF A WIND TURBINE

(71) Applicant: GE Infrastructure Technology LLC, Greenville, SC (US)

(72) Inventors: Ian Couchman, Horley (GB); Till Hoffmann, Osnabrueck (DE); Thomas Franklin Perley, Bluffton, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/893,255

(22) Filed: Sep. 23, 2024

(51) Int. Cl.
*F03D 7/02* (2006.01)
*F03D 9/25* (2016.01)
*F03D 15/00* (2016.01)
*G01C 19/00* (2013.01)

(52) U.S. Cl.
CPC .......... *F03D 7/0298* (2023.08); *F03D 7/0264* (2013.01); *F03D 9/25* (2016.05); *F03D 15/00* (2016.05); *G01C 19/00* (2013.01); *F05B 2220/706* (2013.01); *F05B 2260/964* (2013.01); *F05B 2270/32* (2013.01); *F05B 2270/327* (2013.01)

(58) Field of Classification Search
CPC ... F03D 7/0298; F03D 7/0296; F05B 2270/32
See application file for complete search history.

(56) References Cited

U.S. PATENT DOCUMENTS

| | | | | |
|---|---|---|---|---|
| 4,700,081 A | * | 10/1987 | Kos | F03D 7/0276 700/304 |
| 6,597,141 B1 | * | 7/2003 | Wilson-Jones | H02P 6/16 417/42 |
| 10,480,486 B2 | * | 11/2019 | Brødsgaard | F03D 7/0224 |
| 11,098,695 B2 | * | 8/2021 | Nielsen | F03D 17/00 |
| 2022/0356867 A1 | * | 11/2022 | Frommann | F03D 7/0264 |

FOREIGN PATENT DOCUMENTS

WO WO-2023088416 A1 * 5/2023 .......... F03D 7/0224

* cited by examiner

*Primary Examiner* — Courtney D Heinle
*Assistant Examiner* — John S Hunter, Jr.
(74) *Attorney, Agent, or Firm* — Dority & Manning, P.A.

(57) ABSTRACT

A method for damping drivetrain vibrations of a wind turbine. The drivetrain has, at least, a rotor and a generator. The method includes receiving a first rotational speed signal at a first location along the drivetrain, the first rotational speed signal being a proxy for rotor speed of the rotor. The method also includes receiving a second rotational speed signal at a second location along the drivetrain, the second location being downwind from the first location, the second rotational speed signal being a proxy for generator speed of the generator. Further, the method includes determining a speed error based on a comparison of the first and second rotational speed signals. Moreover, the method includes determining a torque deviation signal for the wind turbine configured to dampen the drivetrain vibrations when the speed error exceeds a first speed threshold. In addition, the method includes applying the torque deviation signal to the generator to dampen the drivetrain vibrations.

20 Claims, 4 Drawing Sheets

SYSTEM AND METHOD FOR MONITORING VIBRATIONS IN A DRIVETRAIN OF A WIND TURBINE

FIELD

The present disclosure relates in general to wind turbines, and more particularly to systems and methods for monitoring vibrations in a drivetrain of a wind turbine.

BACKGROUND

Wind power is considered one of the cleanest, most environmentally friendly energy sources presently available, and wind turbines have gained increased attention in this regard. A modern wind turbine typically includes a tower, a nacelle mounted atop the tower, a rotor mounted to the nacelle having one or more rotor blades, and a drivetrain within the nacelle. The drivetrain typically includes various drivetrain components, such as a generator and a gearbox. The nacelle includes a rotor assembly coupled to the gearbox and to the generator. In many wind turbines, the generator and the gearbox are mounted to a bedplate within the nacelle via one or more torque arms. As such, the one or more rotor blades capture kinetic energy of wind using known airfoil principles. The rotor blades transmit the kinetic energy in the form of rotational energy so as to turn a shaft coupling the rotor blades to the gearbox, or if the gearbox is not used, directly to the generator. The generator then converts the mechanical energy to electrical energy that may be deployed to a utility grid.

Oftentimes, the wind turbine may be equipped with various sensors for determining rotational speed conditions of the drivetrain, such as generator speed. In an example, the generator speed can be passed to a bandpass filter that outputs a drivetrain vibration speed, which can be utilized to achieve certain dynamic control functions, such as damping drivetrain vibrations. However, newer, larger wind turbines have lower drivetrain frequencies, which increases complexity in designing a bandpass filter capable of decoupling drivetrain vibrations from drivetrain speed transients and can result in the filtered generator speed no longer being a good proxy of drivetrain vibration. If the bandpass filtered generator speed is not a good proxy of drivetrain vibration, the wind turbine can become damaged. For example, in the case of the bandpass filtered generator speed not being a good proxy of drivetrain vibration, a turbine controller can apply a modulating torque to the generator that is excessive or insufficient given an actual drivetrain vibration, which can lead to equipment overloads.

As such, the present disclosure is directed to systems and methods that detect deviations between speed measurements at locations along the drivetrain from the rotor to the generator and implement a control action so as to avoid the aforementioned issues.

BRIEF DESCRIPTION

Aspects and advantages of the present disclosure will be set forth in part in the following description, or may be obvious from the description, or may be learned through practice of the present disclosure.

In an aspect, the present disclosure is directed to a method for damping drivetrain vibrations of a wind turbine. The drivetrain has, at least, a rotor and a generator. The method includes receiving a first rotational speed signal at a first location along the drivetrain, the first rotational speed signal being a proxy for rotor speed of the rotor. The method also includes receiving a second rotational speed signal at a second location along the drivetrain, the second location being downwind from the first location, the second rotational speed signal being a proxy for generator speed of the generator. Further, the method includes determining a speed error based on a comparison of the first and second rotational speed signals. Moreover, the method includes determining a torque deviation signal for the wind turbine configured to dampen the drivetrain vibrations when the speed error exceeds a first speed threshold. In addition, the method includes applying the torque deviation signal to the generator to dampen the drivetrain vibrations.

In another aspect, the present disclosure is directed to drivetrain assembly of a wind turbine. The drivetrain assembly includes a rotor shaft for coupling to a rotor of the wind turbine, a gearbox coupled to the rotor shaft, a generator coupled to the gearbox via a generator shaft, and a controller for controlling operation of the wind turbine. The controller includes at least one processor configured to perform a plurality of operations, including but not limited to receiving a first rotational speed signal at a first location along the drivetrain, the first rotational speed signal being a proxy for rotor speed of the rotor; receiving a second rotational speed signal at a second location along the drivetrain, the second location being downwind from the first location, the second rotational speed signal being a proxy for generator speed of the generator; determining a speed error based on a comparison of the first and second rotational speed signals; determining a torque deviation signal for the wind turbine configured to dampen drivetrain vibrations when the speed error exceeds a first speed threshold; and applying the torque deviation signal to the generator to dampen the drivetrain vibrations.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
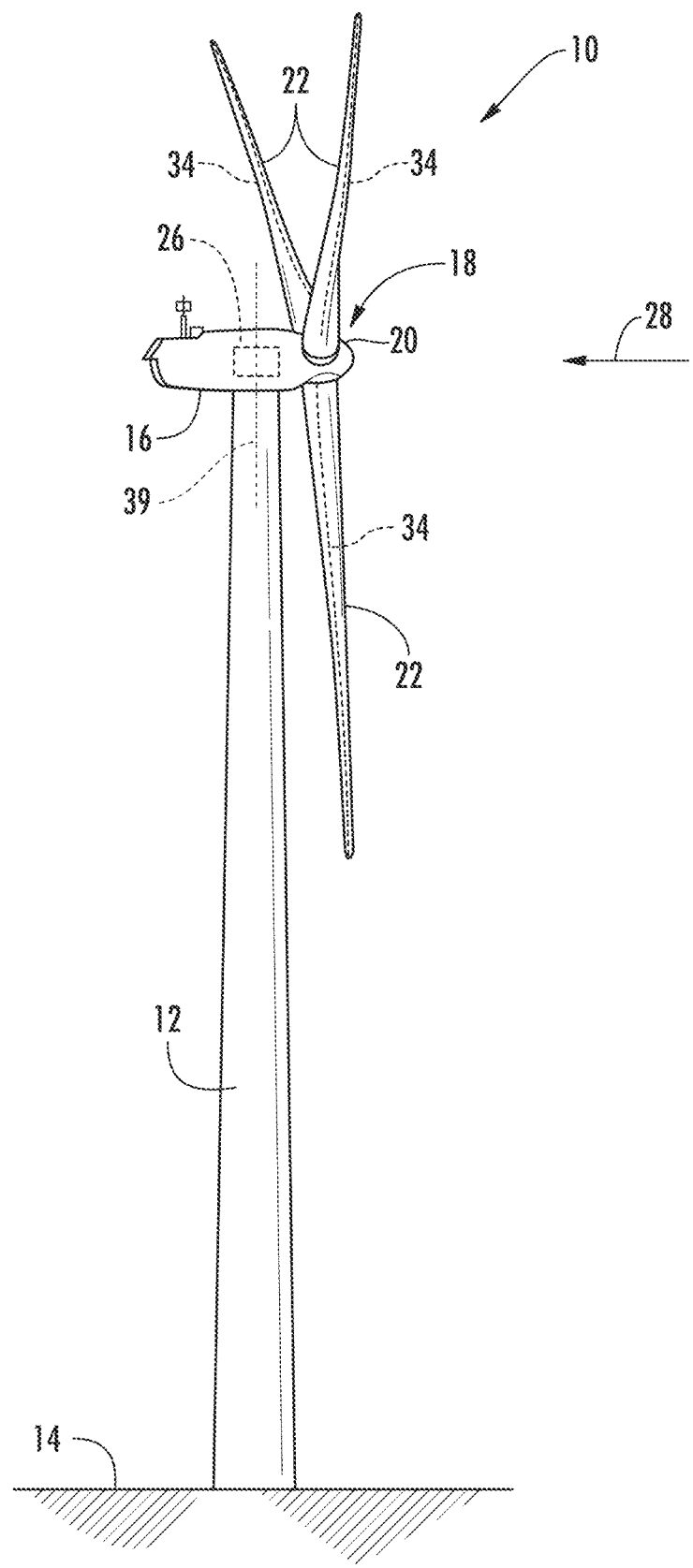
FIG. 1 illustrates a perspective view of a wind turbine according to an embodiment of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope of the present disclosure. For instance, features illustrated or described as part of an embodiment can be used with another embodiment to yield a still further embodiment. Thus, it is intended that the present disclosure covers such modifications and variations as come within the scope of the appended claims and their equivalents.

Generally, the present disclosure is directed to systems and methods for detecting drivetrain speed deviations and responding to such deviations in a way that limits the vibrations of the wind turbine. High fidelity encoders may be used to detect a generator speed of a generator within the wind turbine. Drivetrain vibrations typically can be determined by bandpass filtering the generator speed. Active dampening and supervisory functions can then be performed based on the determined drivetrain vibrations. However, in larger drivetrains, generator speeds alone may not be a good proxy of drivetrain vibrations due to lower drivetrain frequencies. As such, high fidelity encoders can be used at additional locations along the drivetrain to determine a speed error between the locations. The speed error is used as a measure of the drivetrain vibrations, which allows for simpler, more accurate, and more robust performance of active damping and supervisory functions. Accordingly, systems and methods of the present disclosure are configured to apply a torque deviation signal to modulate drivetrain vibrations based on detecting a speed error above a certain threshold between locations along the drivetrain from the rotor to the generator.

Referring now to the drawings, FIG. 1 illustrates perspective view of an embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
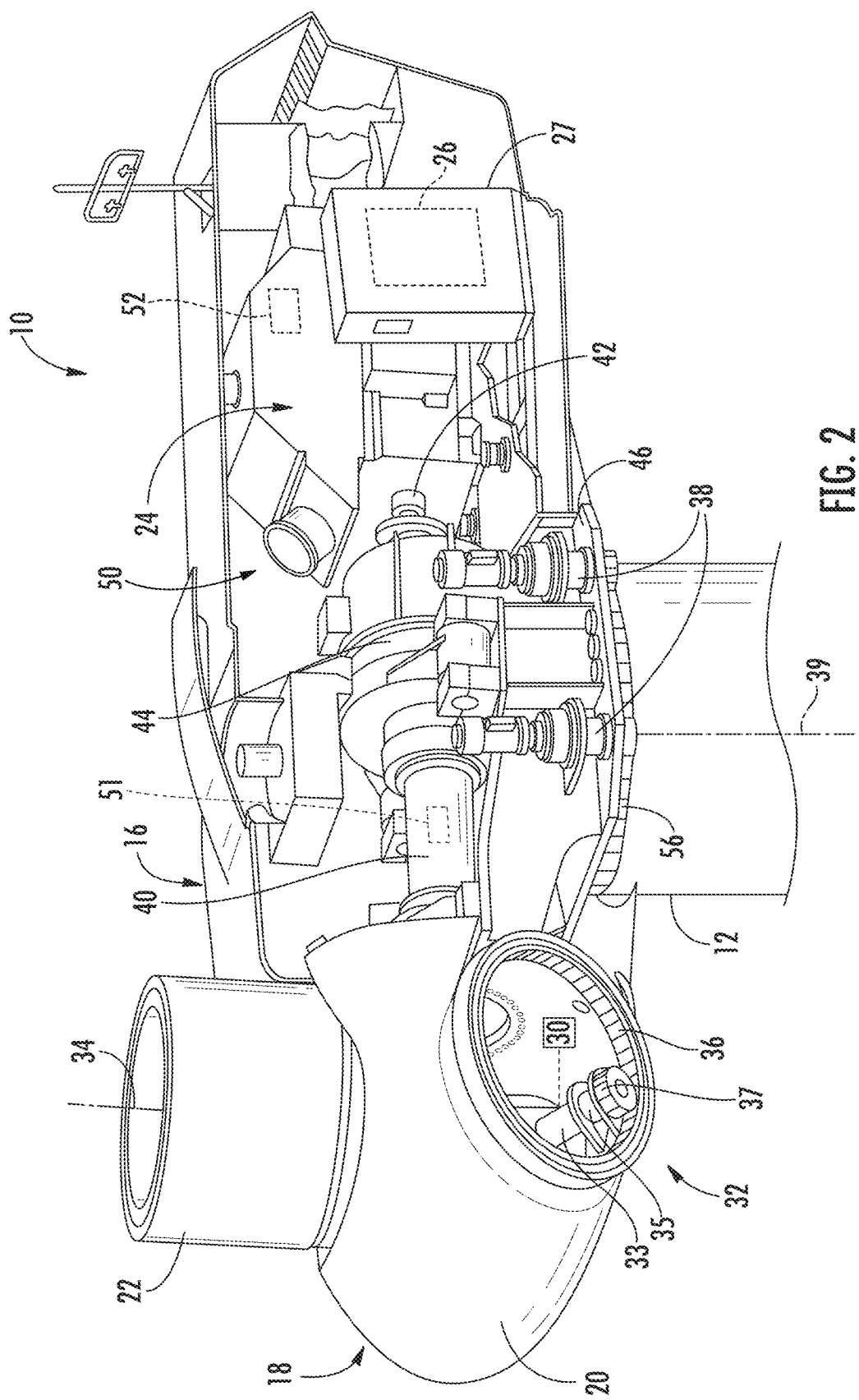
FIG. 2 illustrates a perspective, internal view of a nacelle of a wind turbine according to an embodiment of the present disclosure.

Referring now to FIG. 2, a simplified, internal view of an embodiment of the nacelle 16 of the wind turbine 10 is illustrated. As shown, the wind turbine 10 includes the generator 24 disposed within the nacelle 16. In general, the generator 24 may be coupled to the rotor 18 of the wind turbine 10 for generating electrical power from the rotational energy generated by the rotor 18. For example, the rotor 18 may include a rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44. As is generally understood, the rotor shaft 40 may provide a low speed, high torque input to the gearbox 44 in response to rotation of the rotor blades 22 and the hub 20. The gearbox 44 may then be configured to convert the low speed, high torque input to a high speed, low torque output to drive the generator shaft 42 and, thus, the generator 24. However, in other embodiments, it should be appreciated that the generator shaft 42 may be rotatably coupled directly to the rotor shaft 40. Alternatively, the generator 24 may be directly rotatably coupled to the rotor shaft 40. Such components may be generally referred to herein as a drivetrain 50 or drivetrain assembly.

It should be appreciated that the rotor shaft 40 may generally be supported within the nacelle 16 by a support frame or bedplate 46 positioned atop the wind turbine tower 12. For example, the rotor shaft 40 may be supported by the bedplate 46 via a pair of pillow blocks mounted to the bedplate 46.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 27 mounted to a portion of the nacelle 16. However, it should be appreciated that the turbine controller 26 may be disposed at any location on or in the wind turbine 10, at any location on the support surface 14 (FIG. 1) or generally at any other location. The turbine controller 26 may generally be configured to control the various operating modes (e.g., start-up or shut-down sequences) and/or components of the wind turbine 10.

As shown in FIG. 2, the wind turbine 10 may further include at least one pitch adjustment mechanism 32 for each of the rotor blades 22 that is configured to rotate each rotor blade 22 about its pitch axis 34. In an embodiment, each pitch adjustment mechanism 32 may include a pitch drive motor 33 (e.g., any suitable electric, hydraulic, or pneumatic motor), a pitch drive gearbox 35, and a pitch drive pinion 37. In such embodiments, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 37 for rotation therewith. The pitch drive pinion 37 may, in turn, be in rotational engagement with a pitch bearing 36 coupled between the hub 20 and a corresponding rotor blade 22 such that rotation of the pitch drive pinion 37 causes rotation of the pitch bearing 36. Thus, in such embodiments, rotation of the pitch drive motor 33 drives the pitch drive gearbox 35 and the pitch drive pinion 37, thereby rotating the pitch bearing 36 and the rotor blade 22 about the pitch axis 34. Similarly, the wind turbine 10 may include one or more yaw drive mechanisms 38 communicatively coupled to the controller 26, with each yaw drive mechanism(s) 38 being configured to change the angle of the nacelle 16 relative to the wind (e.g., by engaging a yaw bearing 56 of the wind turbine 10 and rotating the nacelle 16 about a yaw axis 39).

Further, as shown, the turbine controller 26 may also be communicatively coupled to each pitch adjustment mechanism 32 of the wind turbine 10 through a separate or integral pitch controller 30 (FIG. 2) for controlling and/or altering the pitch angle of each respective rotor blade 22 (i.e., an angle that determines a perspective of the rotor blades 22 with respect to a direction 28 of the wind).

In addition, as shown in FIG. 2, one or more sensors 51, 52 may be provided on the wind turbine 10. More specifically, as shown, a shaft sensor 51 may be communicatively coupled with the rotor shaft 40 and/or the rotor 18 to monitor the speed thereof. Further, as shown, a generator sensor 52 may be communicatively coupled with the generator 24 to monitor the speed thereof. Further embodiments may include any other suitable type of sensor, such as wind vanes, accelerometers, or similar. As such, the sensors 51, 52 may further be in communication with the controller 26 and may provide related information to the controller 26.

It should also be appreciated that, as used herein, the term "monitor" and variations thereof indicates that the various sensors of the wind turbine 10 may be configured to provide a direct measurement of the parameters being monitored and/or an indirect measurement of such parameters. Thus, the sensors described herein may, for example, be used to generate signals relating to the parameter being monitored, which can then be utilized by the controller 26 to determine the condition.

Figure 3:
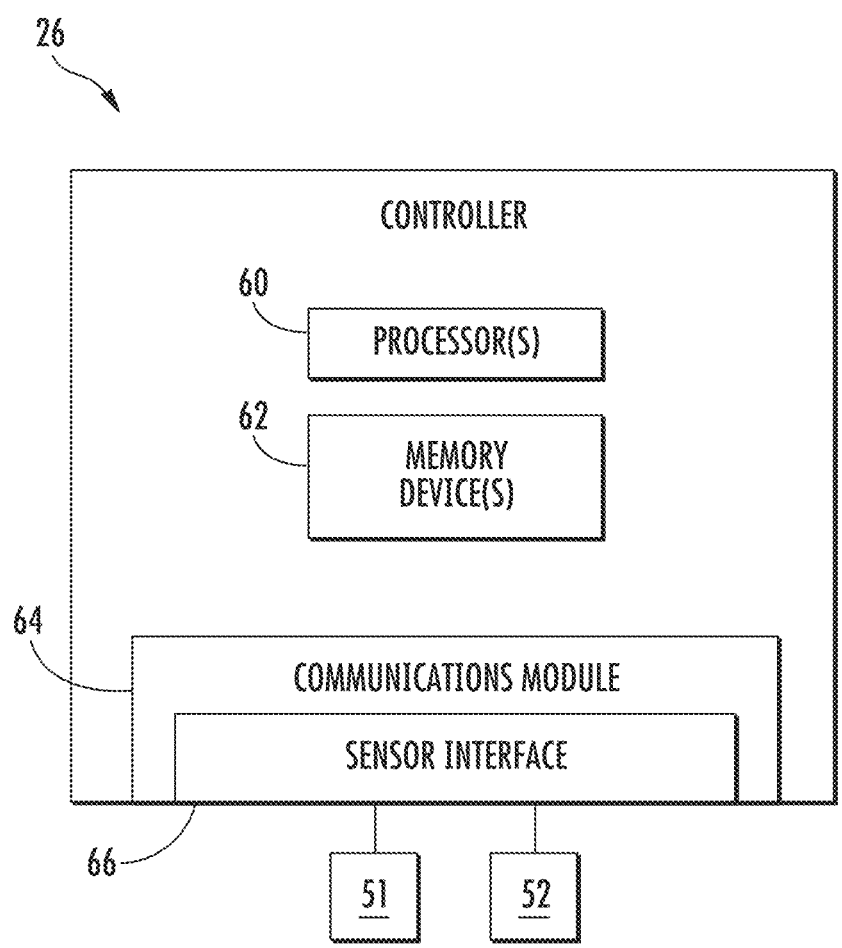
FIG. 3 illustrates a schematic diagram of an embodiment of suitable components that may be included in a wind turbine controller according to the present disclosure.

Referring now to FIG. 3, a block diagram of an embodiment of suitable components that may be included within the controller 26 according to the present disclosure is illustrated. As shown, the controller(s) 26 may include one or more processor(s) 60 and associated memory device(s) 62 configured to perform a variety of computer-implemented functions (e.g., performing the methods, steps, calculations and the like and storing relevant data as disclosed herein).

Additionally, the controller(s) 26 may also include a communications module 64 to facilitate communications between the controller(s) 26 and the various components of the wind turbine 10. Further, the communications module 64 may include a sensor interface 66 (e.g., one or more analog-to-digital converters) to permit signals transmitted from one or more sensors 51, 52 to be converted into signals that can be understood and processed by the processors 60. It should be appreciated that the sensors 51, 52 may be communicatively coupled to the communications module 64 using any suitable means. For example, as shown in FIG. 3, the sensors 51, 52 are coupled to the sensor interface 66 via a wired connection. However, in other embodiments, the sensors 51, 52 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller(s) 26 to perform various functions including, but not limited to, transmitting suitable control signals to implement corrective action(s) in response to a distance signal exceeding a predetermined threshold as described herein, as well as various other suitable computer-implemented functions.

Figure 4:
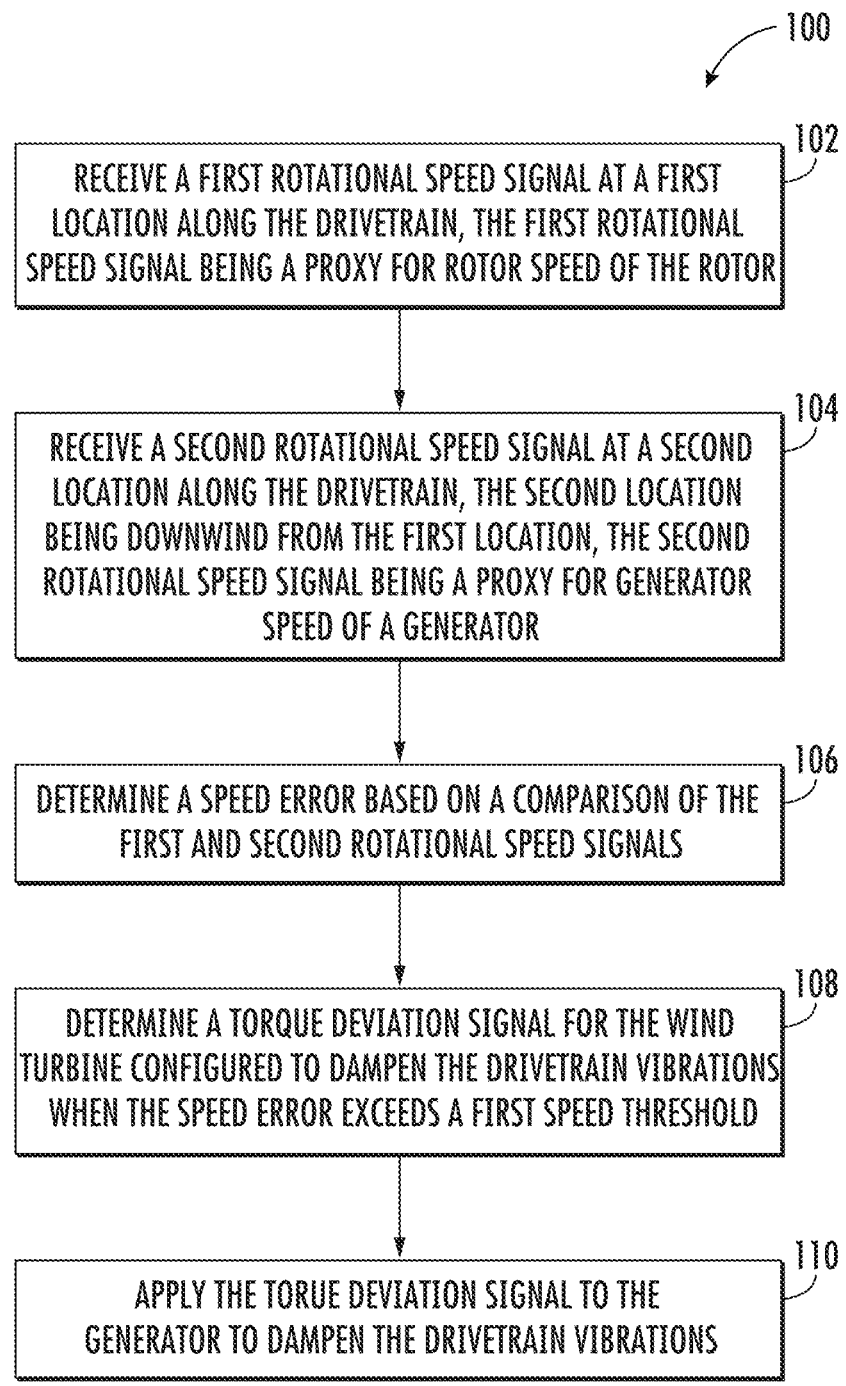
FIG. 4 illustrates a flow diagram of an embodiment of a method for detecting and responding to speed deviations at locations along a drivetrain of a wind turbine according to the present disclosure.

Referring now to FIG. 4, a flow diagram of an embodiment of a method 100 for detecting and damping drivetrain vibrations of a wind turbine is illustrated. The method 100 may be implemented using, for instance, the wind turbine 10 and the controller 26 discussed above with reference to FIGS. 1-3. FIG. 4 depicts steps performed in a particular order for purposes of illustration and discussion. Those of ordinary skill in the art, using the disclosures provided herein, will understand that various steps of the method 100 or any of the other methods disclosed herein may be adapted, modified, rearranged, performed simultaneously, or modified in numerous ways without deviating from the scope of the present disclosure.

As shown at (102), the method 100 includes receiving (e.g., via a controller (such as controller 26)), a first rotational speed signal at a first location along the drivetrain 50. For example, in an embodiment, the first rotational speed signal is a proxy for rotor speed of the rotor 18 of the wind turbine 10. Thus, in an embodiment, the first rotational speed signal may be measured by a sensor 51 mounted in the wind turbine 10 (such on the rotor 18).

Furthermore, in an embodiment, the first location may correspond to a location on or within the hub 20 and/or on the rotor shaft 40. In other words, the method 100 may include receiving the first rotational speed signal via the sensor 51 mounted in the hub 20 of the wind turbine 10 or at a point rigidly connected to the hub 20 (e.g., on the rotor shaft 40). The sensor 51 may be, for example, any suitable type of sensor, such as a bolt counter, a slip ring sensor, a tachometer sensor. As an example, the sensor 51 may be one or more rate gyroscopes (also known as a rate gyro). As used herein, a rate gyro generally refers to a type of gyroscope that indicates the rate of change of an angle with respect to time. If a gyro has only one gimbal ring, with consequently only one plane of freedom, it can be adapted for use as a rate gyro to measure a rate of angular movement. In addition, the rate gyros described herein may also encompass micro-electro-mechanical system (MEMS) gyroscopes.

Furthermore, the rate gyro(s) as described herein is generally effective at detecting fast speed changes but can have a bias (i.e., a DC offset measured at an ambient temperature when the rate gyro is stationary) that can drift (e.g., due to temperature and/or a variety of other factors) over time. The bias may also be present because rate gyro(s) can be difficult to calibrate after providing power thereto as the rate gyro(s) are rarely truly still. Accordingly, in an embodiment, the first rotational speed signal may be processed to account for a bias in the first rotational speed signal due to use of the one or more rate gyroscopes. In additional embodiments, the first rotational speed signal may be processed to account for the bias in the first rotational speed signal due to use of the one or more rate gyroscopes by high pass filtering the first rotational speed signal.

Referring still to FIG. 4, as shown at (104), the method 100 includes receiving (e.g., via the controller 26) a second rotational speed signal from a different, second location along the drivetrain 50. For example, in an embodiment, the second location may be downwind from the first location. Moreover, in an embodiment, the second rotational speed signal is a proxy for generator speed of the generator 24. Thus, in an embodiment, the second rotational speed signal may be measured by a sensor 52 mounted in the wind turbine 10 (such as on the generator 24). In an embodiment, the second rotational speed signal may be measured using any suitable sensor, such as a bolt counter, a slip ring sensor, a tachometer sensor, and/or another one or more rate gyros.

Furthermore, in an embodiment, the second location may correspond to a location on the generator 24. In other words, the method 100 may include receiving the second rotational speed signal via the sensor 52 mounted on the generator 24 or at a point rigidly connected to the generator 24 (e.g., on the generator shaft 42). Accordingly, the first and second rotational speed signals are collected at the extremes of the drivetrain 50 (e.g., at the rotor 18 and at the generator 24).

Furthermore, as shown at (106), the method 100 includes determining (e.g., via the controller 26) a speed error based on a comparison of the first and second rotational speed signals. For example, in an embodiment, determining the speed error based on the comparison of the first and second rotational speed signals may include determining a difference between the first rotational speed signal and the second rotational speed signal. As another example, in an embodiment, determining the speed error based on the comparison of the first and second rotational speed signals may include processing (e.g., according to known signal processing techniques, such as encoding) the first rotational speed signal and the second rotational speed signal and then determining a difference or a ratio of the processed first and second speed signals. The speed error may, for example, be a signed value (i.e., a numerical value represented by a positive or a negative sign) that represents the comparison of the first rotational speed signal and the second rotational speed signal. As another example, the speed error may be an absolute value that represents the comparison of the first rotational speed signal and the second rotational speed signal.

More specifically, in an embodiment, the method 100 may include scaling (e.g., via the controller 26) the second rotational speed signal based on a gearbox ratio prior to determining the speed error. In such an embodiment, the gearbox ratio may be specified based on a size of the gearbox 44 arranged in the drivetrain 50. The gearbox ratio may be stored (e.g., in the memory devices 62 of the controller 26). The second rotational speed signal may be multiplied by the gearbox ratio. In another embodiment, the first rotational speed signal may be divided by the gearbox ratio. Scaling one of the rotational speed signals based on the gearbox ratio allows for a more robust determination of the speed error by accounting for differences between the rotor speed and the generator speed that are introduced via the gearbox 44.

In addition, as shown at (108) of FIG. 4, the method 100 includes determining (e.g., via the controller 26) a torque deviation signal for the wind turbine 10 configured to dampen drivetrain vibrations when the speed error exceeds a first speed threshold. More specifically, in an embodiment, the torque deviation signal may be configured to modulate drivetrain vibrations by applying a torque in a direction to counter the speed error (e.g., in a clockwise direction when the first rotational speed signal is greater than the second rotational speed signal, or in a counterclockwise direction when the second rotational speed sensor is greater than the first rotational speed signal) so as to reduce the speed error. Determining the torque deviation signal may, for example, include accessing (e.g., via the controller 26) a look-up table, or the like, (e.g., stored in the memory devices 62 of the controller 26) that associates various torque deviation signals with various speed errors. In such an example, the controller 26 may then select the torque deviation signal associated with the speed error in the look-up table when the speed error exceeds the first speed threshold. As another example, the torque deviation signal may be determined based on calculating (e.g., via the controller 26) a torque that can modulate vibrations introduced by the speed error so as to reduce the speed error (e.g., according to known techniques).

In an embodiment, the first speed threshold may be a variable threshold dependent on at least one of rotor speed, torque, wind speed, or functions thereof. In another embodiment, the first speed threshold may be a fixed threshold. In such an embodiment, the first speed threshold may be determined empirically (e.g., based on testing and/or simulation to determine a speed error above which application of a torque is capable of modulating vibrations introduced by the speed error (e.g., due to a design and/or size of the wind turbine 10 and/or components thereof)). The first speed threshold may specify a minimum speed error capable of being reduced via torque modulation. Thus, the first speed threshold may be configured to constrain application of the torque deviation signal to prevent undesirable torque modulation of the generator 24. By way of example, the first speed threshold may be zero. As another example, the first speed threshold may be a non-zero numerical value.

Still referring to FIG. 4, as shown at (110), the method 100 includes applying (e.g., via the controller 26) the torque deviation signal to the generator 24 to dampen the drivetrain vibrations. For example, in an embodiment, the torque deviation signal is applied to the generator 24 (e.g., according to known torque modulation techniques) to dampen drivetrain vibrations by reducing the speed error. More specifically, the torque deviation signal may be configured to reduce the speed error below the first speed threshold.

In another embodiment, the method 100 may include shutting down the wind turbine 10 when the speed error exceeds a second speed threshold. In such embodiments, the second speed threshold is greater than the first speed threshold. In an embodiment, the second threshold may be a variable threshold dependent on a function of the speed error and a time period. The method 100 may include determining the speed error for the time period (e.g., based on an envelop of the speed error during the time period). The method 100 may further include comparing the speed error (e.g., the envelope) to the second speed threshold, which may be output by the function in response to the time period being input to the function. Additionally, or alternatively, the second threshold may be a variable threshold further dependent on at least one of rotor speed, torque, wind speed, or functions thereof. In another embodiment, the second threshold may be a fixed threshold. In such an embodiment, the second speed threshold may be determined empirically (e.g., based on testing and/or simulation to determine a speed error above which the wind turbine 10 and/or components thereof may be subjected to excessive equipment overloading regardless of an application of a torque to modulate vibrations introduced by the speed error (e.g., due to a design and/or size of the wind turbine 10 and/or components thereof)). The second speed threshold may specify a maximum speed error capable of being reduced via torque modulation without subjecting the wind turbine 10 and/or components thereof to excessive equipment overloading. Thus, the second speed threshold may be configured to constrain application of the torque deviation signal to prevent excessive equipment overloading.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or conducted in a manner that achieves or optimizes one advantage or group of advantages as taught herein without necessarily achieving other objects or advantages as may be taught or suggested herein.

Various aspects and embodiments of the present disclosure are defined by the following clauses:

A method for damping drivetrain vibrations of a wind turbine, the drivetrain having, at least, a rotor and a generator, the method comprising: receiving a first rotational speed signal at a first location along the drivetrain, the first rotational speed signal being a proxy for rotor speed of the rotor; receiving a second rotational speed signal at a second location along the drivetrain, the second location being downwind from the first location, the second rotational speed signal being a proxy for generator speed of the generator; determining a speed error based on a comparison of the first and second rotational speed signals; determining a torque deviation signal for the wind turbine configured to dampen the drivetrain vibrations when the speed error exceeds a first speed threshold; and applying the torque deviation signal to the generator to dampen the drivetrain vibrations.

The method of any preceding clause, further comprising shutting down the wind turbine when the speed error exceeds a second speed threshold, the second speed threshold being greater than the first speed threshold.

The method of any preceding clause, wherein the second speed threshold is a variable threshold dependent on a function of the speed error and a time period.

The method of any preceding clause, wherein shutting down the wind turbine when the speed error exceeds a second speed threshold further comprises: determining the speed error during the time period; and comparing the speed error to the second speed threshold, the second speed threshold being output by the function in response to the time period being input to the function.

The method of any preceding clause, further comprising determining the first rotational speed signal via a rate gyroscope.

The method of any preceding clause, wherein the rate gyroscope is rigidly connected to the rotor.

The method of any preceding clause, wherein determining the speed error based on the comparison of the first and second rotational speed signals further comprises: determining a difference between the first rotational speed signal and the second rotational speed signal.

The method of any preceding clause, further comprising scaling the second rotational speed signal based on a gearbox ratio prior to determining the speed error.

The method of any preceding clause, wherein the first speed threshold is a variable threshold dependent on at least one of rotor speed, torque, wind speed, or functions thereof.

The method of any preceding clause, wherein the first speed threshold is a fixed threshold.

A drivetrain assembly of a wind turbine, the drivetrain assembly comprising: a rotor shaft for coupling to a rotor of the wind turbine; a gearbox coupled to the rotor shaft; a generator coupled to the gearbox via a generator shaft; and a controller for controlling operation of the wind turbine, the controller comprises at least one processor, the at least one processor configured to perform a plurality of operations, the plurality of operations comprising: receiving a first rotational speed signal at a first location along the drivetrain, the first rotational speed signal being a proxy for rotor speed of the rotor; receiving a second rotational speed signal at a second location along the drivetrain, the second location being downwind from the first location, the second rotational speed signal being a proxy for generator speed of the generator; determining a speed error based on a comparison of the first and second rotational speed signals; determining a torque deviation signal for the wind turbine configured to dampen drivetrain vibrations when the speed error exceeds a first speed threshold; and applying the torque deviation signal to the generator to dampen the drivetrain vibrations.

The drivetrain assembly of any preceding clause, wherein the plurality of operations further comprise: shutting down the wind turbine when the speed error exceeds a second speed threshold, the second speed threshold being greater than the first speed threshold.

The drivetrain assembly of any preceding clause, wherein the second speed threshold is a variable threshold dependent on a function of the speed error and a time period.

The drivetrain assembly of any preceding clause, wherein shutting down the wind turbine when the speed error exceeds a second speed threshold further comprises: determining the speed error during the time period; and comparing the speed error to the second speed threshold, the second speed threshold being output by the function in response to the time period being input to the function.

The drivetrain assembly of any preceding clause, wherein the plurality of operations further comprise determining the first rotational speed signal via a rate gyroscope.

The drivetrain assembly of any preceding clause, wherein the rate gyroscope is rigidly connected to the rotor.

The drivetrain assembly of any preceding clause, wherein determining the speed error based on the comparison of the first and second rotational speed signals further comprises: determining a difference between the first rotational speed signal and the second rotational speed signal.

The drivetrain assembly of any preceding clause, wherein the plurality of operations further comprise scaling the second rotational speed signal based on a gearbox ratio prior to determining the speed error.

The drivetrain assembly of any preceding clause, wherein the first speed threshold is a variable threshold dependent on at least one of rotor speed, torque, wind speed, or functions thereof.

The drivetrain assembly of any preceding clause, wherein the first speed threshold is a fixed threshold.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for damping drivetrain vibrations of a wind turbine, the drivetrain having, at least, a rotor and a generator, the method comprising:
   receiving a first rotational speed signal at a first location along the drivetrain, the first rotational speed signal being a proxy for rotor speed of the rotor;
   receiving a second rotational speed signal at a second location along the drivetrain, the second location being downwind from the first location, the second rotational speed signal being a proxy for generator speed of the generator;
   determining a speed error based on a comparison of the first and second rotational speed signals;
   determining a torque deviation signal for the wind turbine configured to dampen the drivetrain vibrations when the speed error exceeds a first speed threshold; and applying the torque deviation signal to the generator to dampen the drivetrain vibrations by reducing the speed error.

2. The method of claim 1, further comprising shutting down the wind turbine when the speed error exceeds a second speed threshold, the second speed threshold being greater than the first speed threshold.

3. The method of claim 2, wherein the second speed threshold is a variable threshold dependent on a function of the speed error and a time period.

4. The method of claim 3, wherein shutting down the wind turbine when the speed error exceeds a second speed threshold further comprises:
   determining the speed error during the time period; and
   comparing the speed error to the second speed threshold, the second speed threshold being output by the function in response to the time period being input to the function.

5. The method of claim 1, further comprising determining the first rotational speed signal via a rate gyroscope.

6. The method of claim 5, wherein the rate gyroscope is rigidly connected to the rotor.

7. The method of claim 1, wherein determining the speed error based on the comparison of the first and second rotational speed signals further comprises:
   determining a difference between the first rotational speed signal and the second rotational speed signal.

8. The method of claim 1, further comprising scaling the second rotational speed signal based on a gearbox ratio prior to determining the speed error.

9. The method of claim 1, wherein the first speed threshold is a variable threshold dependent on at least one of rotor speed, torque, wind speed, or functions thereof.

10. The method of claim 1, wherein the first speed threshold is a fixed threshold.

11. A drivetrain assembly of a wind turbine, the drivetrain assembly comprising:
    a rotor shaft for coupling to a rotor of the wind turbine;
    a gearbox coupled to the rotor shaft;
    a generator coupled to the gearbox via a generator shaft; and
    a controller for controlling operation of the wind turbine, the controller comprises at least one processor, the at least one processor configured to perform a plurality of operations, the plurality of operations comprising:
    receiving a first rotational speed signal at a first location along the drivetrain, the first rotational speed signal being a proxy for rotor speed of the rotor;
    receiving a second rotational speed signal at a second location along the drivetrain, the second location being downwind from the first location, the second rotational speed signal being a proxy for generator speed of the generator;
    determining a speed error based on a comparison of the first and second rotational speed signals;
    determining a torque deviation signal for the wind turbine configured to dampen drivetrain vibrations when the speed error exceeds a first speed threshold; and
    applying the torque deviation signal to the generator to dampen the drivetrain vibrations by reducing the speed error.

12. The drivetrain assembly of claim 11, wherein the plurality of operations further comprise:
    shutting down the wind turbine when the speed error exceeds a second speed threshold, the second speed threshold being greater than the first speed threshold.

13. The drivetrain assembly of claim 12, wherein the second speed threshold is a variable threshold dependent on a function of the speed error and a time period.

14. The drivetrain assembly of claim 13, wherein shutting down the wind turbine when the speed error exceeds a second speed threshold further comprises:
    determining the speed error during the time period; and
    comparing the speed error to the second speed threshold, the second speed threshold being output by the function in response to the time period being input to the function.

15. The drivetrain assembly of claim 11, wherein the plurality of operations further comprise determining the first rotational speed signal via a rate gyroscope.

16. The drivetrain assembly of claim 15, wherein the rate gyroscope is rigidly connected to the rotor.

17. The drivetrain assembly of claim 11, wherein determining the speed error based on the comparison of the first and second rotational speed signals further comprises:
    determining a difference between the first rotational speed signal and the second rotational speed signal.

18. The drivetrain assembly of claim 11, wherein the plurality of operations further comprise scaling the second rotational speed signal based on a gearbox ratio prior to determining the speed error.

19. The drivetrain assembly of claim 11, wherein the first speed threshold is a variable threshold dependent on at least one of rotor speed, torque, wind speed, or functions thereof.

20. The drivetrain assembly of claim 11, wherein the first speed threshold is a fixed threshold.

\* \* \* \* \*